United States Patent [19]
Worthington

[11] 3,760,854
[45] Sept. 25, 1973

[54] LOG-SPLITTER FOR USE WITH VEHICLES HAVING HYDRAULIC PRESSURE SYSTEMS

[76] Inventor: Robert D. Worthington, Todds Rd., Rt. No. 7, Lexington, Ky. 40502

[22] Filed: June 23, 1972

[21] Appl. No.: 265,719

[52] U.S. Cl. .......................................... 144/193 A
[51] Int. Cl. .............................................. B271 7/00
[58] Field of Search ............................... 144/193 A

[56] References Cited
UNITED STATES PATENTS

| | | | |
|---|---|---|---|
| 3,280,864 | 10/1966 | Spanenberg | 144/193 A |
| 3,319,675 | 5/1967 | Bles | 144/193 A |

*Primary Examiner*—Donald R. Schran
*Attorney*—William E. Sherwood

[57] ABSTRACT

A log-splitter includes a ground-engagable beam with a hydraulic cylinder on the upper beam surface receiving pressure fluid from a vehicle to which the splitter is detachably connected for transportation and for selective lifting of the splitter. The connection of the splitter to the vehicle is made at the end of the beam nearer the center of gravity of the log-splitter.

5 Claims, 4 Drawing Figures

LOG-SPLITTER FOR USE WITH VEHICLES HAVING HYDRAULIC PRESSURE SYSTEMS

BACKGROUND OF THE INVENTION

Many forms of log-splitters ranging from towed vehicles having their own hydraulic power sources for operating the splitter, such as the engine driven pumps taught in Bruckner U.S. Pat. No. 3,077,214 and Hellstrom U.S. Pat. No. 3,242,955, to towed vehicles receiving hydraulic power from a prime mover such as a tractor as found in Spanenberg U.S. Pat. No. 3,280,864 or Cole U.S. Pat. No. 3,356,115 have been proposed. Such arrangements however, require a lifting of the unsplit log to a height above the axle of the towed vehicle and are more expensive in that a wheel and axle substructure are necessary. Another version as disclosed in Bles U.S. Pat. No. 3,319,675 is detachably connected to a hydraulic system equipped tractor having a three point hitch, as represented by the present invention, but is required to dispose an elongated cylinder beneath the beam with a piston rod which operatively projects beyond the beam, and to shift the center of gravity of the splitter away from that hitch. By contrast, the present log splitter embodies the simplicity of the Spanenberg device with the advantages of the Bles device for transportability and in addition provides for adjustments of elevation for handling of logs.

Summary

The log splitter is designed to receive hydraulic power from a conventional three-point hitch equipped vehicle and includes an elongated beam with a hydraulic cylinder mounted near one end of the beam on the upper surface thereof. The cylinder includes a piston rod attached to a log-engaging abutment movable in a track on the beam and adapted to force the log against a stationary splitting head at the distal end of the beam. A laterally extending rod at the one end of the beam detachably connects the beam to the lower two hitch arms and a braced upright at the one end of the beam detachably connects the beam to the upper hitch arm. A manually operable valve mounted on the beam adjacent the extended position of the piston in the cylinder controls flow into and from the cylinder and aids in a one-man operation of the splitter.

Among the objects of the invention are the provision of an improved log splitter which may be employed at a selected height for minimum lifting of the log; the provision of a relatively inexpensive log splitter construction which may be operated by a single worker; the provision of a sturdy log splitter having its center of gravity disposed for most efficient lifting and transportation by a vehicle equipped with a three-point hitch; and the pro-vision of a log splitter which receives its power from a conventional vehicle having a hydraulic pressure system with which the log splitter may be easily connected or disconnected.

These and other objects and advantages of the invention will become more apparent as the description proceeds and when considered in conjunction with the accompanying drawing in which, FIG. 1 is a perspective view of the log splitter attached to a conventional tractor in readiness for use.

Figure 1:
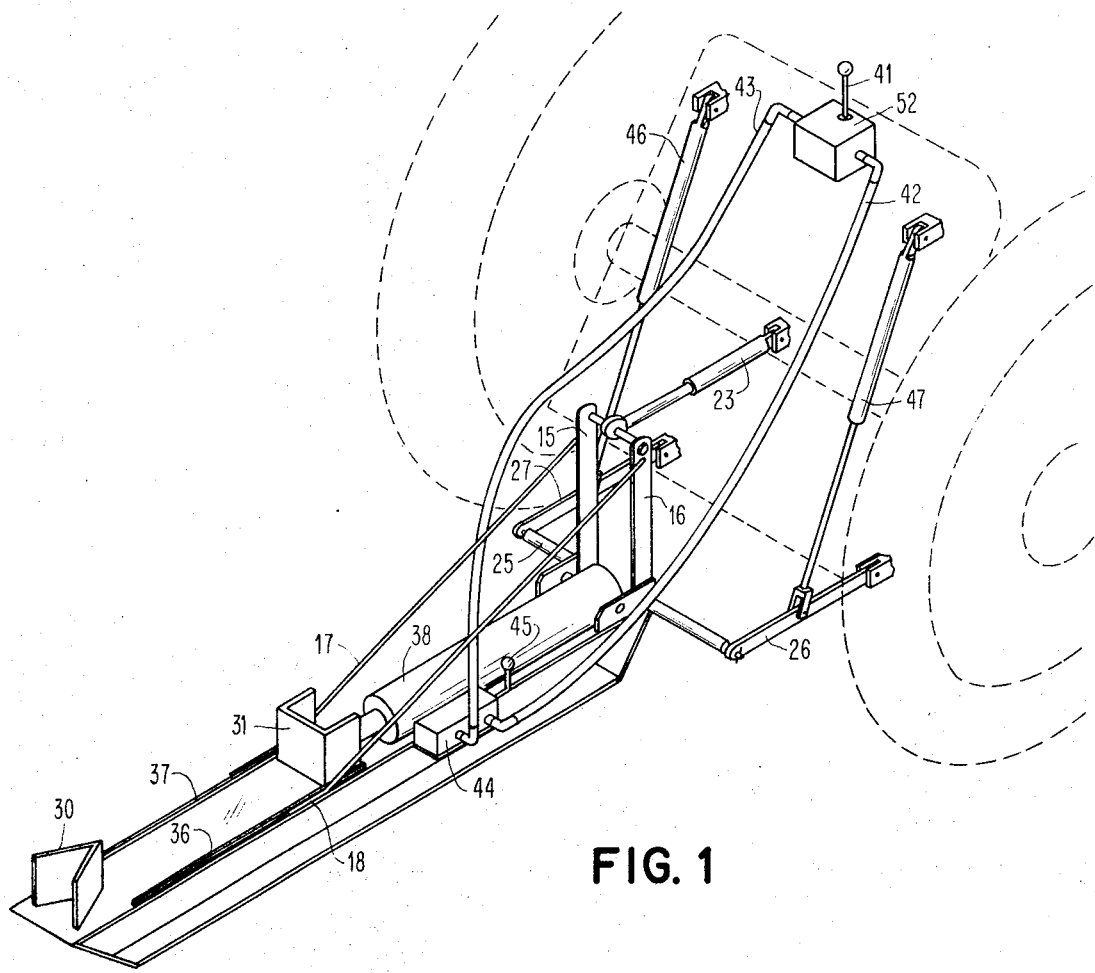
Figure 3:
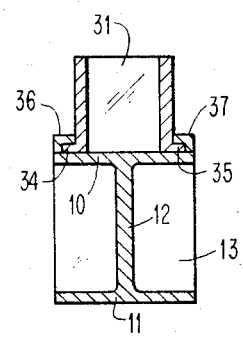
FIG. 3 is a sectional view taken on line 3—3 of FIG. 2.
Figure 2:
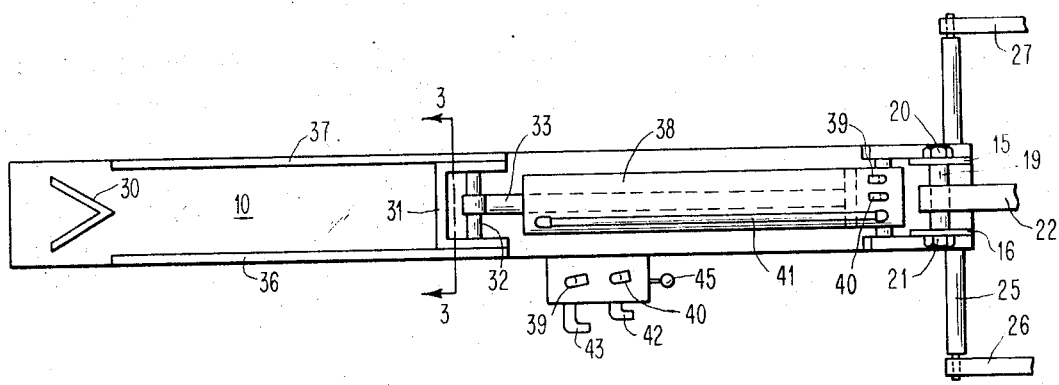
FIG. 2 is a plan view to a larger scale of the log splitter partially broken away and with portions omitted in the interest of clarity.
Figure 4:
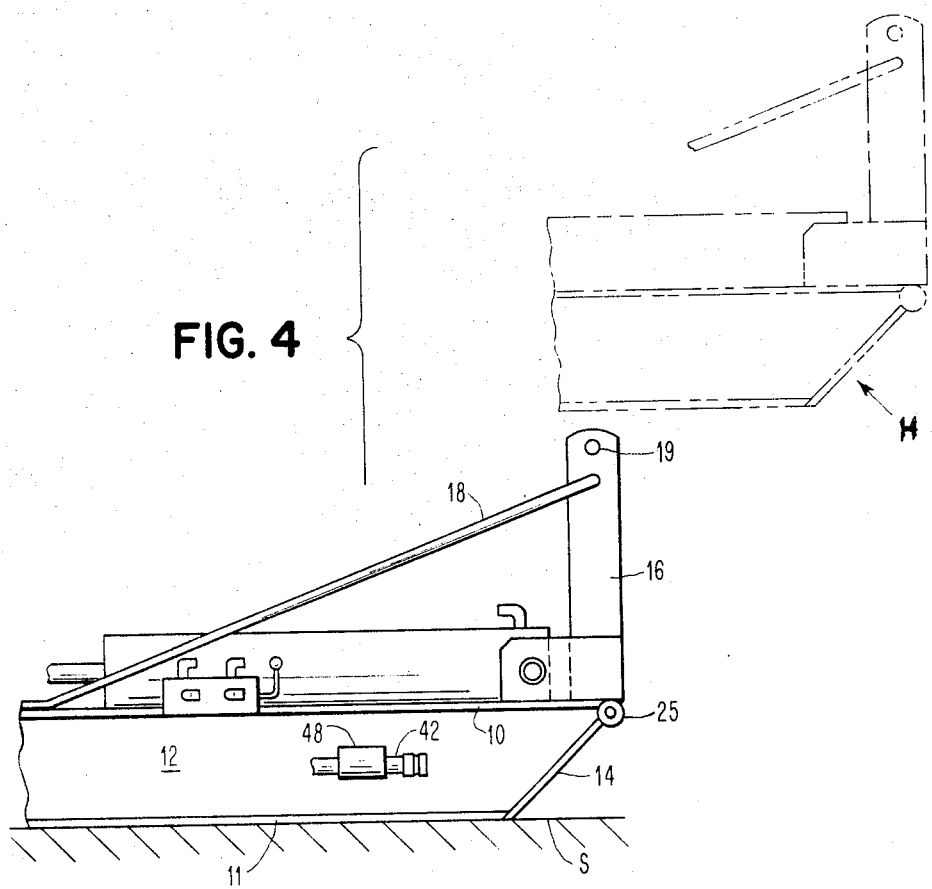
FIG. 4 is a view indicating the adaptability of the splitter for use in varied positions when attached to a suitable hitch of the tractor.

Referring first to FIGS. 2, 3 and 4, a beam of H-shape whose upper face 10 is of sufficient width to support a large diameter log and whose lower face 11 is sufficient to provide a substantial ground engaging surface, includes a central web 12 and is cut at the ends on a bias with forward and rearward skid plates 13, 14 welded thereto to permit simple positioning of the splitter during maneuvering of the vehicle. A pair of spaced uprights 15, 16 are affixed to the upper face 10 at a first end and are braced by tension rods 17, 18 extending from the upper ends of the uprights to the sides of the beam at a forward point where no interference with the handling of the log is incurred. At their upper ends these uprights are provided with holes through which a bolt 19 threaded at its ends extends and which is held by nuts 20, 21. A clevis 22 extending to a turnbuckle pivotally connected to the upper arm 23 of the hitch (FIG. 1) is disposed between the uprights in surrounding relation to bolt 19.

In addition an elongated rod 25 is affixed to the web 12 of the beam below the uprights and projects outwardly therefrom a distance corresponding to the spacing between the lower arms 26, 27 of the hitch. Those lower arms are pivotally connected at their outer ends to the projecting ends of rod 25 and are secured thereto with any suitable detachable fastening.

Near the second end of the beam a V-shaped splitting head 30 which may be of hardened steel, is suitably affixed to the upper face of the beam in confronting relation to the end of the log pushed thereagainst by movable abutment 31. This abutment includes side walls, as best seen in FIGS. 2 and 3, mounting a pin 32 on which a piston rod 33 is journalled and with lower side guides 34, 35 adapted to move along and beneath rails 36, 37 extending from about the mid-point of the beam to adjacent the splitting edge of the head 30. The piston rod extends from a conventional double-acting cylinder 38 mounted on the upper face 10 of the beam and with its closed end located adjacent the uprights thereby to dispose the weight of the cylinder as near as practicable to the attachments of the log splitter to the hitch points. Suitable conduits 39, 40 and 41 are provided for leading pressure fluid selectively to and from the respective ends of the cylinder.

Referring now to FIG. 1, the invention comprehends the use of the improved log splitter with a general purpose vehicle such as a farm tractor to which the splitter may easily be attached while resting on the ground and after attachment may be moved to any suitable worksite by that tractor. Such a tractor, for example, may have the usual drive wheels connected by an axle and with a pump 52 at the rear face of the tractor body being driven by the tractor engine and adapted to circulate pressure fluid in its hydraulic system under control of a tractor mounted valve lever 41. Detachably connected to the pump circuit are two flexible conduits 42, 43 leading to a valve housing 44 mounted on the beam at a position adjacent the fully retracted position of the abutment. Conveniently, the pump may circulate about 12 gallons of fluid per minute at an effective pressure of about 2,000 pounds per square inch and this has been found to be sufficient to operate a relatively small diameter cylinder having a 31 inch stroke in the splitting of logs composed of common varieties of wood.

The valve housing 44 contains a conventional valve operated by a two-way control lever 45 which can be reached by the operator while loading or unloading logs or sections thereof on the beam. Moreover, the tractor is provided with conventional hitch adjusters 46, 47 pivotally attached near the rear face of the tractor and including rods having a pivoted clevis attachment to the lower arms 26, 27 of the hitch.

As will be understood, the lever 41 is operated by the tractor driver from his seat on the tractor so as to select the height of the hitch for a given work site and to establish flow from the pump through conduits 42, 43, after which the tractor operator may then dismount and work at the log splitter. As seen in FIG. 4 the log splitter may rest on the ground surface S to avoid lifting of logs to a distance greater than the height of beam surface 10 or may be raised to a substantial height H as when logs on a wagon are to be shifted to the beam for splitting. When the splitter is being moved from one work site to another the splitter normally will occupy position H. Such movement imposes mechanical stress on the hitch and the described location of the center of gravity of the splitter aids in reducing such stress. Moreover, at all times the presence of the inlined support members 17, 18 assists in maintaining the structural integrity of the uprights connected to the hitch and serves as a convenient support to which the flexible conduits may be lashed.

Following the log splitting operation the worker lowers the beam to the ground; disconnects conduits 42, 43 (the free ends of which may be then secured in simple brackets on the sides of the beam, one such bracket 48 for conduit 42 being indicated in FIG. 4); and disconnects the hitch from the splitter.

Having thus described a preferred form of log splitter, it will be understood that the invention may also be embodied in forms other than that exemplified as the preferred form.

What is claimed is:

1. A log-splitter for removable attachment to a vehicle having a three-point hitch and a hydraulic pressure system including, an elongated beam, a hydraulic cylinder mounted on the upper face of said beam adjacent a first end thereof, a splitting head longitudinally spaced from said cylinder and mounted on the upper face of said beam adjacent a second end thereof, a track on said upper face between the cylinder and the head, an abutment engageable with and movable along said track and actuated by a piston rod extending from said cylinder, a transverse rod projecting from the sides of said beam adjacent said first end thereof and adapted to be detachably and pivotally connected to the lower two arms of the hitch, an upright fixed to said beam adjacent the first end thereof and adapted to be detachably and pivotally connected to the upper arm of the hitch, a pair of conduits detachably connected to the hydraulic system of the vehicle and communicating with the respective ends of said cylinder, and a control valve mounted on said beam intermediate the ends thereof and serving to direct fluid in said conduits selectively into and from the respective ends of said cylinder.

2. A log-splitter as defined in claim 1 wherein said hitch connections are of a type permitting said beam selectively to rest on the ground or to be raised to an elevated position above the ground.

3. A log-splitter as defined in claim 1 wherein said control valve is mounted at a position adjacent the fully retracted position of said abutment.

4. A log-splitter as defined in claim 1 including an inclined support member connected to said upright and said beam and extending from adjacent the top of said upright to a point intermediate the ends of said beam.

5. A log-splitter ad defined in claim 1 wherein the center of gravity of said log-splitter at all times is nearer said first end of said beam than said second end thereof.

* * * * *